March 10, 1964 L. P. GIESELER 3,124,753

METHOD AND APPARATUS FOR PRODUCING RANDOM NUMBERS EMPLOYING PLURAL GENERATORS HAVING DIFFERENT REPETITION RATES

Filed Aug. 21, 1961

3 Sheets-Sheet 1

INVENTOR
LUTHER P. GIESELER

BY Fisher, Christen and Goodson

ATTORNEYS

March 10, 1964 L. P. GIESELER 3,124,753

METHOD AND APPARATUS FOR PRODUCING RANDOM NUMBERS EMPLOYING PLURAL GENERATORS HAVING DIFFERENT REPETITION RATES

Filed Aug. 21, 1961 3 Sheets-Sheet 2

INVENTOR
LUTHER P. GIESELER

BY Fisher, Christen and Goodson

ATTORNEYS

INVENTOR
LUTHER P. GIESELER
BY Fisher, Christen and Goodson
ATTORNEYS 3,124,753

METHOD AND APPARATUS FOR PRODUCING RANDOM NUMBERS EMPLOYING PLURAL GENERATORS HAVING DIFFERENT REPETITION RATES

Luther P. Gieseler, Falls Church, Va., assignor to C-E-I-R, Inc., Arlington, Va., a corporation of Delaware Filed Aug. 21, 1961, Ser. No. 132,824
14 Claims. (Cl. 328—61)

This invention relates generally to the production of random numbers and more specifically to a method and apparatus for emitting a number in response to an impulse which originates either from an external circuit or from an internal circuit. If the impulse originates from an internal circuit, numbers are emitted continuously as long as the internal timer circuit is turned on.

The use of random numbers is applicable to many fields, one such field being in mathematical computations. For example, "Monte Carlo" methods require the use of a series of random numbers for calculation purposes. As a matter of interest, reference is made to the following publication: "Symposium on Monte Carlo Methods," edited by Herbert A. Meyer and published by John Wiley and Sons, 1956.

Random numbers are also used in the simulation of systems subject to "noise." In this application, the random numbers are introduced into the computations in a manner similar to the presence of noise fluctuations in the system being simulated which results in a more accurate simulation of the system.

A further object of the invention is to produce a number of pulses, the time interval between successive pairs of pulses varying in a random manner as described below. This would be useful, for example, in the field of radar. It is known that if the radar transmitter emits signals of random time duration, the equipment is less susceptible to countermeasures. Accordingly, the first of the above-mentioned pulses could be used to turn the transmitter on, and the second used to turn it off.

Random number generators in present use are of two general types. The first method involves the use of a general purpose computer for mathematical computation and the second method relates to the use of the random property of a physical phenomenon such as the fluctuations in a stream of particles from a radioactive source.

The disadvantage of the first method is that it is relatively slow and consumes valuable computer time which could otherwise be used for other calculations. The second method has the disadvantage that the statistical character of the numbers is inflexible and entirely dependent upon the physical process used.

Accordingly, an object of the present invention is to provide a method and apparatus for generating random numbers, and randomly spaced pulses.

A further object of this invention is to provide a pulse generator having an easily variable statistical character.

Another object of this invention is to provide a random number generator which does not require the use of a digital computer.

Yet another object of this invention is to provide a random number and pulse generator by means of a simple and reliable circuit which contains well known and readily available components.

These and other objects will become apparent from the following description taken in conjunction with the drawing wherein.

Figure 1:
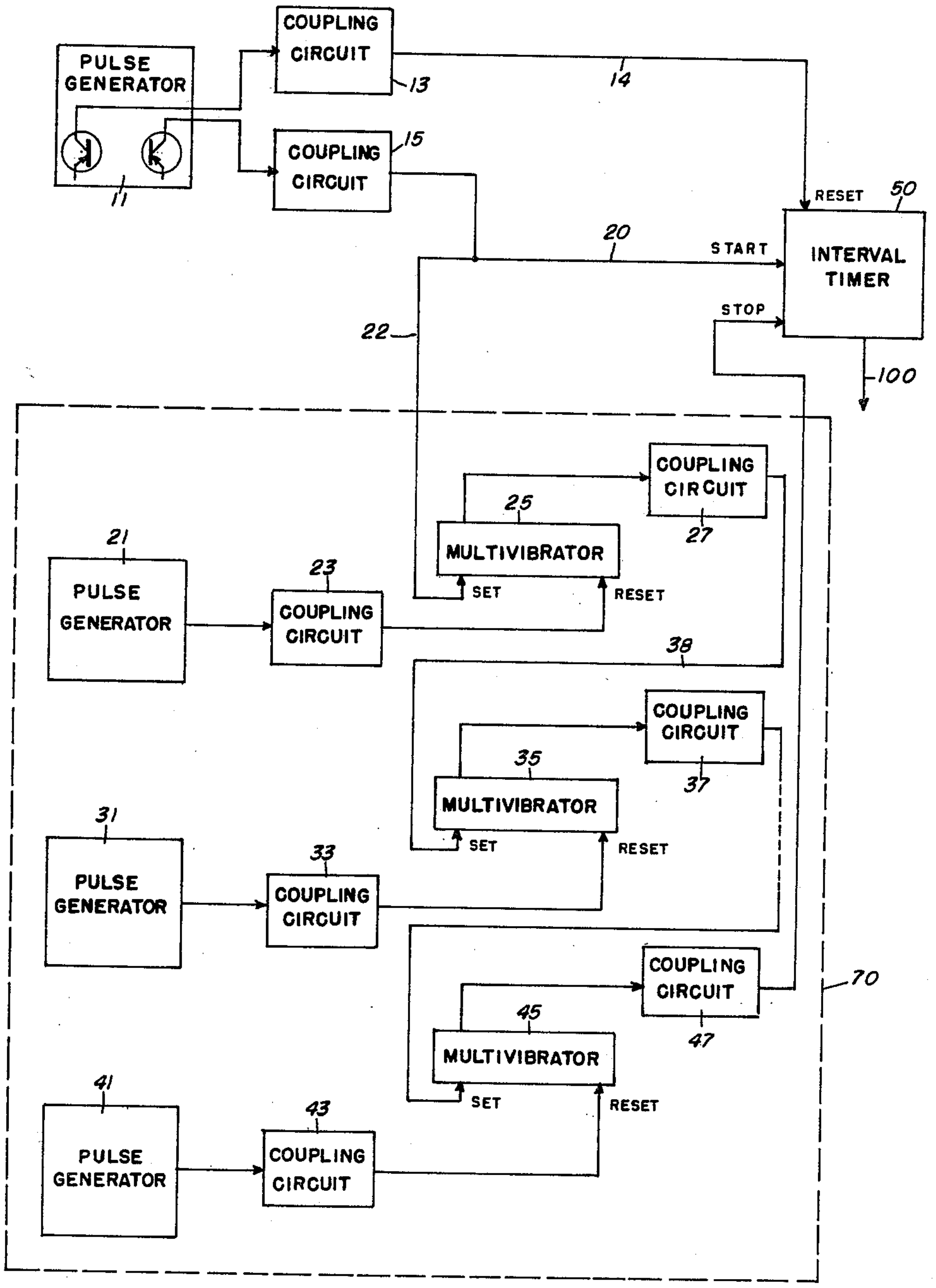
FIG. 1 is a schematic illustration of the basic invention.

In FIG. 1 there is illustrated, schematically, a plurality of pulse generators 11, 21, 31 . . . 41. These pulse generators may be of the transistorized astable multivibrator type as more specifically indicated in pulse generator 11. This type of astable multivibrator is used for generating square waves and timing frequencies. However, any circuit could be used which produces the desired pulses as explained in the following description.

Pulse generator 11 initiates the production of one random number. A reset pulse is first emitted from pulse generator 11 and passes through the coupling circuit 13, lead 14 and is applied to the "reset" terminal of the interval timer 50. Interval timer 50 may be of any of the well known types such as that produced by the Hewlett-Packard Company and identified as Model 522B Electronic Counter.

After the interval timer 50 is reset, a second pulse is emitted from the pulse generator which passes through coupling circuit 15, and lead 20 to the "Start" terminal of the interval timer. This second pulse, which starts the interval timer, also passes by means of lead 22 to the "Set" terminal of multivibrator 25, thus driving multivibrator 25 to the set position. This multivibrator may be of the bi-stable or flip-flop type. The polarity of the output of multivibrator 25 when changing from the reset to the set condition is such that there is no effect on interconnected multivibrator 35.

Pulse generators 21, 31 . . . 41 normally have higher pulse repetition rates than that of the initiating pulse generator 11 and, additionally, are emitting pulses continuously at their predetermined rates. The output pulse from generator 21 is applied to the "Reset" terminal of multivibrator 25, through coupling circuit 23 and lead 24, which remains in this reset condition until it has been set by a pulse from generator 11. The next following pulse from generator 21 resets multivibrator 25 which has an output at this time of the correct polarity to set multivibrator 35 through coupling circuit 27 and lead 38.

In the same manner, pulse generator 31 applies a reset pulse through coupling circuit 33 to multivibrator 35, causing it to remain in the normal reset condition. Thus, when a "set" pulse arrives at multivibrator 35, the next following pulse from the generator 31 will reset this multivibrator which, at this time, has an output of the correct polarity to set multivibrator 45. The rest of the circuit follows the same sequence of operation as described above with the output of the last multivibrator, here shown as 45, being applied to the interval timer as a stop pulse. When the circuit operation is complete, the reading of the interval timer is the desired random number, shown as output 100. In lieu of an interval timer, the start and stop pulses may be used in any system where two pulses are desired whose spacing in time is random.

FIG. 1 illustrates an embodiment in which a total of four pulse generators are used. However, it can be seen from the above description that the circuit may be enlarged indefinitely by adding additional pulse generators, coupling circuits, and multivibrators. Conversely the circuit may be reduced in complexity by deleting some of these units.

To illustrate the above process, generator 11 initiates a pulse at time $T_1$. $T_2$ designates the time of occurrence of the first pulse emitted by generator 21 following $T_1$, $T_3$ the time of occurrence of the first pulse from generator 31 following $T_2$ and $T_n$ the time of occurrence of the first pulse emitted by the last generator 41 following the pulse of the previous generator. The time interval $\Delta T$ between the start and stop pulses applied to the interval timer will be—

$$\Delta T = T_n - T_1 = (T_2 - T_1) + (T_3 - T_2) + \ldots + (T_n - T_{n-1})$$

Figure 2A:
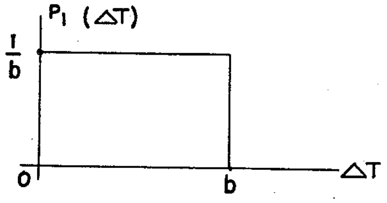
FIG. 2 is a graphic illustration of probability density functions of the invention.

The statistical character of $\Delta T$ will be understood by first considering a simplified circuit consisting of two pulse generators and one bistable multivibrator. If it is assumed that the two pulse generators are not synchronized in any way, and that the average time between successive pulses of the second pulse generator equals $b$ seconds, the time interval as measured by the timer will vary from essentially zero when a pulse from the first generator 11 is immediately followed by a pulse from the second generator to $b$ seconds when a pulse from the second generator 21 is immediately followed by a pulse from the first. Furthermore, any interval between 0 and $b$ seconds is equally likely to occur. The probability density function, $P_1(\Delta T_1)$, for the time interval $\Delta T = T_2 - T_1$, will appear as shown in FIG. 2*a*, i.e., a rectangle.

If a third generator 31 is added to the system, the equation for $\Delta T$ becomes—

$$\Delta T = (T_2 - T_1) + (T_3 - T_2) = \Delta T_1 + \Delta T_2$$

Figure 2B:
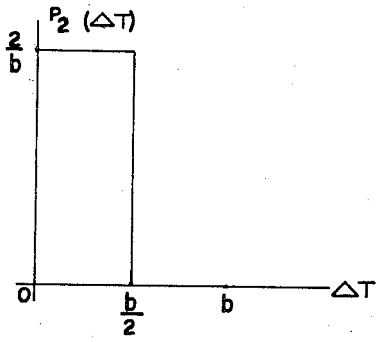

If it is assumed that the average interval between the pulses from pulse generator 31 of FIG. 1 is equal to $b/2$ seconds, and that the third pulse generator 41 is not synchronized with the other two generators in any way, the probability density function, $P_2(\Delta T_2)$ will also be a rectangle as shown in FIG. 2*b*.

Statistical theory such as discussed in "Random Processes in Automatic Control," Lansing and Battin, published by McGraw-Hill, 1956, illustrates the fact that the probability density function of the sum of two variables which are statistically independent equals—

$$P'(z) = \int_{-\infty}^{\infty} P_1(x) P_2(z-x)\,dx$$

Figure 2C:
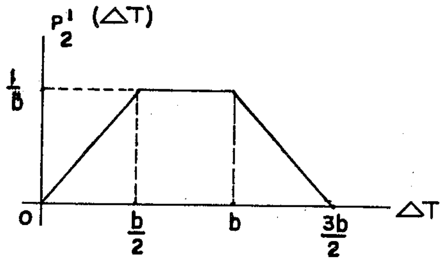

Evaluating this integral for the above discussed two functions $P_1(\Delta T_1)$ and $P_2(\Delta T_2)$ as illustrated in FIGS. 2*a* and 2*b* yields the trapezoidal function $P_2'(\Delta T)$ as illustrated in FIG. 2*c*.

If it is then assumed that a fourth pulse generator 41 as shown in FIG. 1 is used which has an average interval between pulses also equal to $b/2$ seconds but is not synchronized in any way with pulses from 11, 21, and 31, the equation for $\Delta T$ becomes—

$$\Delta T = T_2 - T_1 + (T_3 - T_2) + (T_4 - T_3) = (\Delta T_1 + \Delta T_2) + \Delta T_3$$

The probability density function for $\Delta T_3$ is identical to that of $\Delta T_2$ as illustrated in FIG. 2*b* and the probability density function for $\Delta T$ becomes—

$$P_3'(\Delta T) = \int_{-\infty}^{\infty} P_2'(x) P_2(\Delta T - x)\,dx$$

Figure 2D:
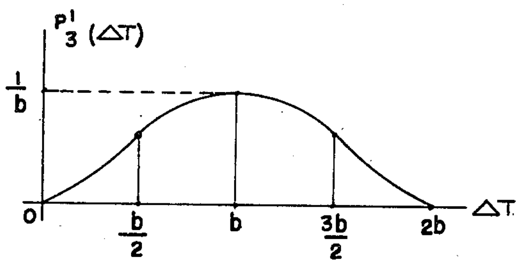

Evaluating this integral for various values of $\Delta T$ results in the function shown in FIG. 2*d* which is made up of four parabolic sections.

Thus it can be seen that rectangular, trapezoidal and approximately Gaussian probability density functions are obtainable by using two, three, and four pulse generators respectively. It is also apparent that still further variations are possible by varying the time interval between successive pulses, by using additional pulse generators, and by applying selective synchronization between some of the pulse generators.

Figure 3:
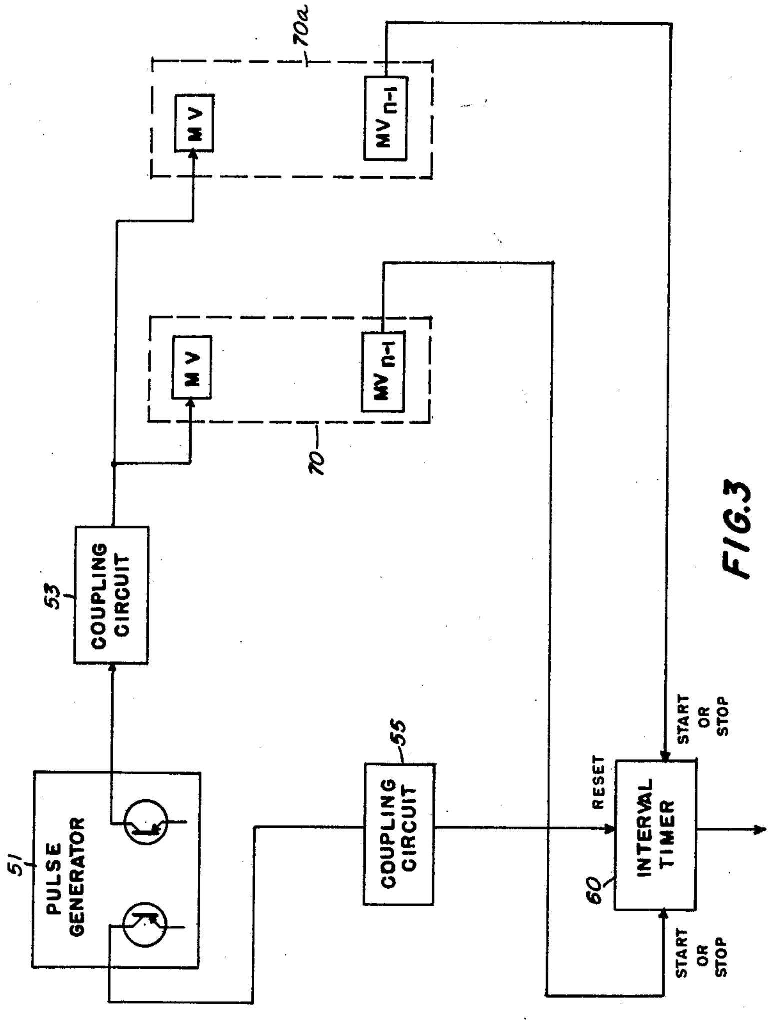
FIG. 3 is a schematic illustration of a further embodiment of the invention.

A modification of the above-described random number generator is illustrated in block diagram in FIG. 3. In this modification, the circuit will generate random numbers which have a mean value of zero. As will be apparent, this modification is a complex system using the basic system shown in FIG. 1. An initiating pulse generator 51, similar to generator 11 of FIG. 1, feeds a pulse to the interval timer 60 through coupling circuit 55. A short time later it supplies a pulse to the two systems 70 and **70*a* through the coupling circuit 53. Systems 70 and 70*a* are two sub-systems similar to that part of FIG. 1 enclosed within the dashed lines 70. Sub-systems 70 and 70*a* need not be identical in that the number of pulse generators in each sub-system may differ. For instance, sub-system 70 may contain only a single multivibrator whereas sub-system 70*a*** may be a more complex system.

The interval timer is designed in this system so that a positive number is registered if a pulse is emitted from sub-system 70 before one is emitted from sub-system **70*a***, and a negative number is registered if the reverse occurs. After the pulse generator has reset the interval timer, whichever sub-system is the first to emit a pulse also initiates the start of the interval timer and the other sub-system stops the timer whereby a random number and a corresponding random timer interval is generated.

All of the elements shown and described in block form may be implemented by using standard pulse-type circuits. A description of such circuits may be found, for example, in the following published references:

"Selected Semi-Conductor Circuit Handbook," Seymour Schwartz, published by John Wiley and Sons, 1956.

"General Electric Transistor Manual," published 1960.

The above references pertain to transistors and standard transistor circuits. It is well known that similar performance can be accomplished by vacuum tube circuits, circuits employing magnetic devices, and various electro-mechanical, mechanical, hydraulic or pneumatic devices. Specifically, the bistable multivibrator circuits 25, 35 and 45 of FIG. 1 may be replaced by generalized circuits which may be defined as type A logical devices which have an "activate" and a "trigger" input and which are well known in the computer art, and which have an output suitable for coupling to the "activate" input of another similar type A device. The "activate" terminal corresponds to the "reset" terminal and the "trigger" corresponds to the "set" terminal of the bistable multivibrator circuits. The design of the type A circuit is such that repeated impulses to either the "trigger" or the "activate" terminals produce little or no output. An output is produced only by the first impulse applied to the "trigger" terminal following one or more impulses on the "activate" terminal. The times of occurrence of said first trigger impulse and the output pulse should be substantially equal.

Various other modifications of the invention will now be apparent in the light of the above disclosure. One example of such modifications would be to replace the pulse generator 11 by external pulse generating equipment to initiate production of the random number. Accordingly, all such modifications are intended to be included within the scope of the present invention as described in connection with the illustrative embodiment shown in the drawings.

I claim:

1. A random number generator comprising an initiating pulse generator, an interval timing device, first means coupling the output of said initiating pulse generator to said interval timing device for resetting said device, second means coupling said pulse generator to said timing device for initiating a time interval measurement by said device in response to a pulse from said initiating pulse generator, a plurality of pulse generators having predetermined pulse repetition rates, activate-trigger means for each of said plurality of pulse generators, each activate-trigger means having an "activating" terminal and a "trigger" terminal, said activate-trigger means coupled to said pulse generators by means of a "trigger" terminal, means coupling an "activating" terminal of the first of said activate-trigger means to the output of said initiating pulse generator, means coupling the output of each of said activate-trigger means to the input of the next following activate-trigger means, each of said pulse generators impulsing the "trigger" terminal of its respective activate-trigger means, each of said activate-trigger means having an output which impulses the "activate" terminal of the following activate-trigger means and means coupling the output of the last of said activate-trigger means to said interval timing device for stopping said timing device in response to an output from said last means.

2. A generator of randomly spaced pairs of pulses comprising an initiating pulse generator, a plurality of pulse generators having predetermined pulse repetition rates, a separate activate-trigger means for each of said plurality of pulse generators, each activate-trigger means having an "activating" terminal and a "trigger" terminal, said activate-trigger means coupled to said pulse generators by means of a "trigger" terminal, means coupling an "activating" terminal of the first of said activate-trigger means to the output of said initiating pulse generator, means coupling the output of each activate-trigger means to the input of the next following activate-trigger means each of said pulse generators impulsing the "trigger" terminal of its respective activate-trigger means, each of said activate-trigger means having an output which impulses the "activate" terminal of the following activate-trigger means and means coupling the output of the last of said activate-trigger means to the output terminal of said generator.

3. A random number generator comprising an initiating pulse generator, an interval timing device, first means coupling the output of said initiating pulse generator to said interval timing device for resetting said device, second means coupling said pulse generator to said timing device for initiating a time interval measurement by said device in response to a pulse from said initiating pulse generator, a plurality of pulse generators having predetermined pulse repetition rates, a separate bistable circuit coupled to the output of each of said plurality of pulse generators, means coupling the input of the first of said bistable circuits to the output of said initiating pulse generator for driving said first bistable circuit to its first stable position in response to said pulse from said initiating pulse generator, means coupling the output of each bistable circuit to the input of the next following bistable circuit, each of said pulse generators driving its respective bistable circuit to its second stable position, each of said bistable circuits having an output when changing from the first to the second stable position which drives the following bistable circuit to said first position and means coupling the output of the last of said signal generating means to said interval timing device for stopping said timing device in response to an output from said last device.

4. A generator of randomly spaced pairs of pulses comprising an initiating pulse generator, a plurality of pulse generators having predetermined pulse repetition rates, a separate bistable circuit coupled to the output of each of said plurality of pulse generators, means coupling the input of the first of said bistable circuits to the output of said initiating pulse generator for driving said signal generating means to its first stable position in response to said pulse from said initiating pulse generator, means coupling the output of each bistable circuit to the input of the next following bistable circuit, each of said pulse generators driving its respective bistable circuit to its second stable position, each of said bistable circuits having an output when changing from the first to the second stable position which drives the following bistable circuit to said first position and means coupling the output of the last of said signal generating means to the output terminal of said generator.

5. A random number generator comprising an interval timer, means for starting said interval timer, a plurality of multivibrators, having first and second stable states, means for driving the first of said multivibrators to said first stable state simultaneously with the start of said interval timer, means coupling the output of each of said multivibrators to the input of the next following multivibrator, a separate pulse generator having a predetermined pulse repetition rate connected to each of said multivibrators for driving said multivibrators to said second stable states, the output of each multivibrator when changing from the first to the second state driving the next following multivibrator to said first state, and means coupling the last of said multivibrators to said interval timer, the output of said last multivibrator stopping said interval timer.

6. A random number generator for generating positive and negative numbers comprising in combination an impulse generator; an interval timer; connecting means from the impulse generator to the impulse timer to reset the latter in response to the former; a first random number generator; a second random number generator; connecting means from the impulse generator to each of the random number generators for initiating operation thereof; further connections from each of the random number generators to the interval timer for starting and stopping the timing operation, each random number generator initiating starting of the timer if it is inoperative and initiating stopping of the timer if it is operative; and output means from the interval timer for providing a negative random number in response to its stopping by one of the generators and a positive number in response to its stopping by the other generator.

7. The apparatus of claim 6 wherein each of said random number generators comprises randomly actuatable pulse developing means in stages numbering at least one stage to a plurality of stages.

8. The apparatus of claim 7 wherein the randomly actuatable stages are operable from non-random pulse trains in response to conditions set by the next preceding stage.

9. A random number generator comprising a plurality of pulse generator devices connected in series; the output of each of said devices initiating an output from the next following device; a further pulse generator coupled to the input of the first pulse generator device for providing an initiating pulse thereto to initiate an output therefrom; a timing device coupled to the further pulse generator for starting from the initiating pulse to measure the time interval between the initiating pulse and the output of the last pulse generator device; and coupling means connecting the output of the last pulse generator device to the timing device for stopping the timing.

10. The apparatus of claim 9 further comprising means coupling said timing device to said further pulse generator for resetting said timing device.

11. A random number generator comprising a plurality of bistable multivibrators connected in series, a separate pulse generator having a predetermined pulse repetition rate connected to the inputs of each of said multivibrators, said pulse generators driving said multivibrators to identical stable states, the output of each multivibrator when driven to its alternate stable state driving the next following multivibrator to its alternate stable state, impulse generating means for temporarily driving the first of said multivibrators to its alternate state and means for measuring the time interval between said generated impulse and the output of the last of said multivibrators.

12. The apparatus of claim 11 wherein said means for temporarily driving the first of said multivibrators comprises a pulse generating device coupled to the input of said first multivibrator for providing an initiating pulse thereto.

13. The apparatus of claim 9 wherein the means for measuring the time interval comprises an interval timing device coupled to said pulse generating device, said timing device being started by said initiating pulse from said impulse generating device and means coupling said timing device to the output of said last pulse generating device, the output of said last pulse generating device stopping said timing device.

14. The apparatus of claim 10 further comprising means coupling said interval timing device to said pulse generating device for resetting said timing device.

References Cited in the file of this patent

UNITED STATES PATENTS

| | | |
|---|---|---|
| 2,853,235 | Brimster et al. | Sept. 23, 1958 |
| 2,860,832 | Burns | Nov. 18, 1958 |
| 3,049,676 | Sinke | Aug. 14, 1962 |